Jan. 30, 1951  R. R. WARD ET AL  2,539,559
SPRAYING DEVICE
Filed May 31, 1947
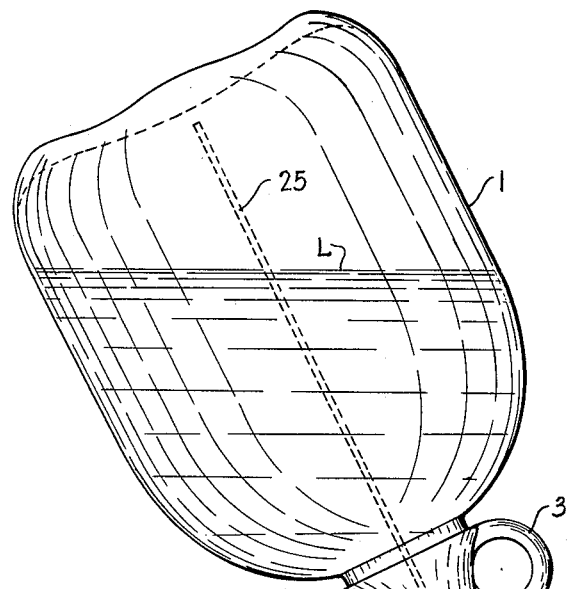
Fig. 1
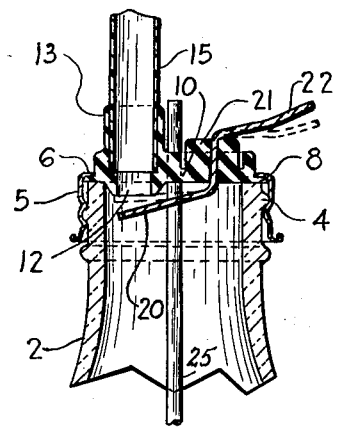
Fig. 2
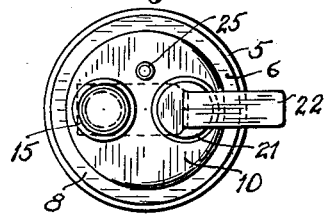
Fig. 3
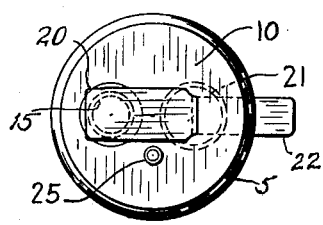
Fig. 4
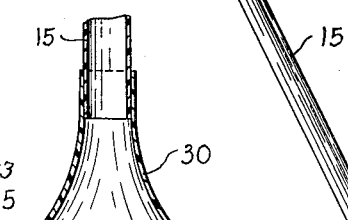
Fig. 5  Fig. 7
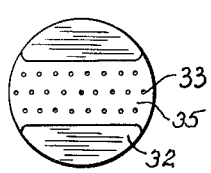
Fig. 6
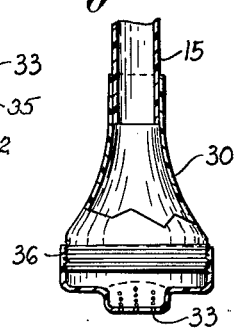
Fig. 8
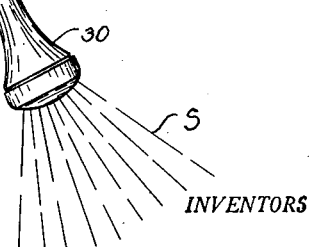
INVENTORS
RAYMOND R. WARD,
HAROLD A. WATERS,
BY Justin W. Macklin
ATTY Patented Jan. 30, 1951

2,539,559

UNITED STATES PATENT OFFICE 2,539,559

SPRAYING DEVICE

Raymond R. Ward, Brecksville, and Harold A. Waters, Columbus, Ohio, assignors to The Sherwin Williams Company, Cleveland, Ohio, a corporation of Ohio Application May 31, 1947, Serial No. 751,528

1 Claim. (Cl. 299—102)

This invention relates to a spraying device and has for its essential objects the utilization of a standard type of liquid container to which our spraying device is adapted to be attached, and which shall afford a substantially uniform even spray, both when the container is full and when only a small amount of liquid remains in the container.

In our device the spray is effected by gravity pull, and an object is to provide means for securing a gravity pressure head, or spraying force, even when the liquid in the container reaches a low level, and by which means also the spray may be conveniently directed.

In its preferred form our device comprises a cap attachment for a jug or like container, a venting tube leading to a point above the liquid in the container when the container is inverted, to assure free flow, and an extension carrying a specially constructed spray head or nozzle. An easily operable shutoff valve is provided to interrupt the flow while the parts are held in spraying position.

A special use for such a spraying device is that of applying selective herbicides, such as 2,4-dichloro-phenoxyacetic acid, its salts, or its esters, and other weed killers, plant foods, and the like, which it may be desired to apply to individual plants or to selected large areas such as lawns.

Further objects include the provision of a fine fan-shaped spray, and in the use of which a carefully controlled quantity of the liquid may be sprayed upon a given area. The minimum speed of flow should be such that the desired fan-shape and sufficient force is maintained for effective use. To this end the extension provides a liquid pressure head or column of about one foot or more when the container is inverted and the spray nozzle is in active position.

Other objects include the provision of such a device which may be cheaply manufactured, which shall be durable and efficient in use, and which may be conveniently attached to a container of a type easily obtainable such as glass jugs or the like, which are widely used for household liquids.

Other more specific objects will become apparent in the following description which relates to the accompanying drawings, and in which:

Fig. 1 is a side elevation of a suitable container showing our invention fitted thereto and in operative position.

Fig. 2 is a fragmentary axial section showing parts attached to the neck or opening of the container.

Fig. 3 is a bottom view of the parts shown in Fig. 2, the container portion being omitted.

Fig. 4 is a plan view of the same.

Fig. 5 is a section through the spray nozzle.

Fig. 6 is an end elevation of the same.

Fig. 7 is a section through the spray nozzle, taken at right angles to the plane of Fig. 5.

Fig. 8 is a sectional detail showing a slightly modified form of the spray head attachment.

There has been an increasingly extensive use of modern herbicides, plant foods, and the like, which are mixed with water and sprayed on the plants or lawns. However, inconvenience has been encountered in the use of such materials.

Our invention provides means whereby the householder or gardener may utilize a conveniently available container in which the material may be prepared by mixing the liquid and from which it may be applied by spraying with our device attached to the same container.

Referring to the drawings by the use of reference characters, the container 1 appearing in Fig. 1 is illustrative of any suitable container and is there shown as an ordinary one gallon jug having a neck portion 2, handle 3, and the usual threads indicated at 4 (in Fig. 2). A screw cap ring 5, similar to the usual closure cap except that it has an open top, is shown as threaded onto the threads 4. The cap ring 5 has an inturned flange 6 extending partially over the end of the neck portion, and acting to clamp a flange 8 of a closure member 10 which serves as a carrier for the spray extension tube, the vent tube and the valve.

The closure member 10 is preferably formed of resilient plastic material such as molded rubber. As shown, it comprises essentially a disk-like body portion from which the flange 8 extends and by which it is clamped in closing position. Through the body portion of the closure member are formed openings around one of which, constituting the pouring or exit opening 12, is an outward extension or sleeve adapted to receive the end of a nozzle tube 15.

At the inner side of the body portion and around the opening 12 is a valve seat in the form of a beveled or conical flange against which a flat valve member 20 may be pressed to shut off a flow of liquid from the interior of the container through the opening 12 and tube 15.

A boss-like portion 21 is surrounded by a groove extending partially through the body portion 10 and is provided with a slot tightly gripping the intermediate offset section of a lever member, one end of which forms the valve 20, and the other end of which presents an extended handle or finger lever, indicated at 22.

By the arrangement shown, the boss 12 may be tilted slightly with relation to the remainder of the body portion 10 sufficiently to effect the opening and closing of the valve without tending to change the normal position of the tube 15 and that of the tube 25. The closing position of this valve member 20 against its bevel valve seat and of its lever 22 is indicated by the broken lines in Fig. 2.

Another opening, passing through the body of the closure member 10, receives a small vent tube, indicated at 25, which may extend from a point outside of the container to a point near its bottom on the inside. This tube may be adjusted longitudinally, being closely but slidably embraced by the opening in the resilient body of the member 10.

The nozzle tube 15 may be rigid or semi-rigid to allow directing the spray by manipulating the portable container while being held approximately in the position shown in Fig. 1. Both the tubes 15 and 16 may be made of somewhat flexible plastic, if desired.

The outer end of the tube 15 is fitted with a nozzle comprising a cone-shaped member 30, which with the cap 32 forms a chamber from which the spraying openings 33 lead outwardly through an arc-shaped surface, indicated at 35.

The broken lines 34 in Fig. 5 indicate the axes of the openings 33 indicating their radial direction normal to the arcuate surface 35. As shown, these small openings 33 are arranged in parallel rows with the result that the spray is flat or fan-shaped.

The raised surface 35 merges with a flat surface, and both the outer wall surfaces of the end of the nozzle join to a cylindrical side wall which may abut, or telescope over, and be cemented onto the flange 31 of the member 30. This cap may be attached to the bell-shaped member permanently or may be removable for convenience in cleaning the small spray openings 33. One method of removably attaching the spray cap is indicated in Fig. 8, where the flange is threaded and engages threads 36 on the cylindrical end of the member 30.

Our invention is preferably employed with a gallon jug in which the ingredients of the material to be sprayed may be mixed. In most instances, it is preferable when employing spray materials to be mixed with water that the jug first be partially filled with water and the active spray material then be added thereto in the proportion required for a full gallon of the diluted mixture. After the jug has been shaken to effect thorough mixing, sufficient additional water may be added to fill the jug. Our spraying device is then attached by inserting the tube 25, and then screwing the cap 5 into position onto the jug. The small tube 25 is adjusted to be near, but not closed by touching, the bottom of the jug. The container and spray attachment are then tilted or inverted, and obviously the pressure of the liquid flowing through the tube 15 to the sprayed head will force the liquid outwardly in definitely directed streams through the opening 33.

Although the tube 15 may be flexed, it normally maintains the position shown, and the spray direction may be accomplished merely by moving the jug or container as it is carried over the area to be sprayed. The spray is indicated by the lines S in Fig. 1, and in practice it forms a fan-shaped spray including approximately a forty-five degree angle at the start, and obviously the liquid may be directed in a concentrated area, or spread in very finely distributed streams over a larger area.

The length of the extension tube 15 is such that the head or pressure column of the liquid is sufficient to form an effective spray even though the body of the liquid L has been lowered in the inverted container to the level at which the container is substantially empty. The size, number, and arrangement of the spraying openings 33 may be selected according to the average pressure head effected by the proportions and dimensions of the device as a whole so as to produce a predetermined, substantially constant rate of discharge of the liquid. Because the pressure head is necessarily relatively small in a device of this character, the resultant discharge spray is in the form of a number of fine, distinct, diverging streams that produce little or no mist that might be blown onto areas or plant surfaces which could be damaged thereby, as when the liquid being sprayed is a potent herbicide.

Having thus described our invention, what we claim is:

In combination with a container having a restricted, externally threaded outlet opening, a spraying device comprising a cap ring engaging the threads of said opening and having an inwardly extending annular flange, a closure member formed of resilient material and having an outwardly extending annular flange clamped against the perimeter of said opening by the annular flange of said cap ring and having an aperture therethrough, a substantially rigid tubular member fitted into said aperture for communication with the interior of said container and projecting outwardly therefrom a distance approximately as great as the depth of the container, a spray nozzle carried on the outer end of said tubular member, a rigid offset valve member extending through the body portion of the closure member into proximity with the inner side of said aperture, said valve member having an external lever extension by means of which the valve member may be manually moved into closing engagement with said aperture, movement of said valve member being permitted by the resilience of said closure member, and a second tubular member passing through said closure member toward the bottom of the container to provide an air vent permitting continuous flow of liquid from said container through said tubular member and spray nozzle when the container is inverted.

RAYMOND R. WARD.
HAROLD A. WATERS.

REFERENCES CITED

The following references are of record in the file of this patent:

UNITED STATES PATENTS

| Number | Name | Date |
|---|---|---|
| 16,822 | Babbitt | Mar. 17, 1857 |
| 486,298 | Ricker | Nov. 15, 1892 |
| 549,678 | Miller | Nov. 17, 1895 |
| 752,803 | Ross | Feb. 23, 1904 |
| 1,518,412 | Ross | Dec. 9, 1924 |
| 1,601,723 | Elbert | Oct. 5, 1926 |
| 1,916,912 | Armstrong | July 4, 1933 |
| 1,952,437 | Huber | Mar. 27, 1934 |
| 2,148,196 | Falk | Feb. 21, 1939 |
| 2,156,313 | Schwab | May 2, 1939 |
| 2,176,395 | Evers | Oct. 17, 1939 |
| 2,196,323 | Norton et al. | Apr. 9, 1940 |
| 2,249,274 | Faine | July 15, 1941 |
| 2,281,642 | Ulanet | May 5, 1942 |
| 2,387,699 | Bates | Oct. 23, 1945 |

FOREIGN PATENTS

| Number | Country | Date |
|---|---|---|
| 194,719 | Switzerland | Apr. 1, 1938 |
| 327,351 | Italy | July 11, 1935 |
| 616,824 | France | Nov. 6, 1926 |